(No Model.)
E. D. McLEAN.
REVERSING VALVE GEAR.
No. 295,033. Patented Mar. 11, 1884.
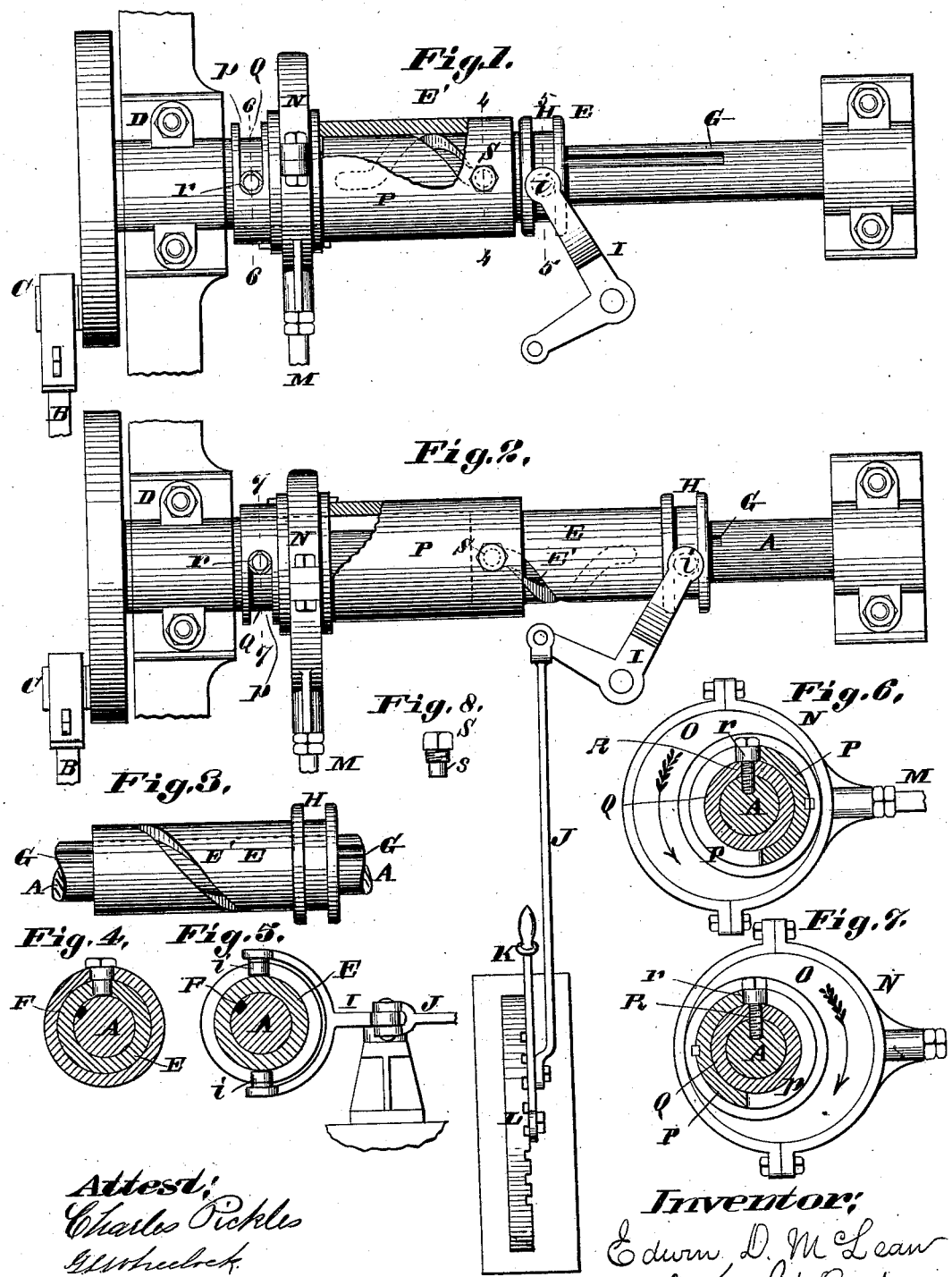
Attest:
Charles Pickles
G. S. Wheelock
Inventor:
Edwin D. McLean
By Knight Bros.
Attys.

UNITED STATES PATENT OFFICE.

EDWIN D. McLEAN, OF MARISSA, ILLINOIS.

REVERSING-VALVE GEAR.

SPECIFICATION forming part of Letters Patent No. 295,033, dated March 11, 1884.

Application filed September 28, 1883. (No model.)

*To all whom it may concern:*

Be it known that I, EDWIN D. MCLEAN, of Marissa, in the county of St. Clair and State of Illinois, have invented a certain new and useful Reversing-Valve Gear for Steam-Engines, of which the following is a full, clear, and exact description, reference being had to the accompanying drawings, forming part of this specification.

Reference is made to the claims for statement of invention.

Figures 1 and 2 are top views of my improvement, showing the eccentric in opposite positions upon the crank-shaft. Parts are broken away to exhibit other parts beneath. Fig. 3 is a detail view of the sliding sleeve. Fig. 4 is a transverse section at 4 4, Fig. 1. Fig. 5 is a transverse section at 5 5, Fig. 1. Fig. 6 is a transverse section at 6 6, Fig. 1, and Fig. 7 is a transverse section at 7 7, Fig. 2. Fig. 8 is a side view of the cam-pin in the eccentric-sleeve.

The device is for the purpose of turning the eccentric upon the main (or crank) shaft of the engine, so that the movement of the valve, and consequently the rotation of the shaft, is reversed.

A is the main shaft of a steam-engine, rotated by pitman B and crank C.

D is the pillow-block.

E is a sleeve sliding endwise upon the shaft A, and which has feather-key connection with the shaft by means of a key, F, upon the sleeve, and a seat or groove, G, in the shaft, or vice versa.

H is a circumferential groove of the sleeve E, which receives the studs $i$ upon the forked end of the bell-crank lever I, so that by movement of the lever the sleeve is caused to slide upon the main shaft. (See Figs. 1 and 2.) The lever is moved by means of a connecting-rod, J, hand and-lever K. The latter is held in the desired position in any well-known or suitable way. I have shown a notched bar, L, the arrangement being such that the lever springs into any one of the notches with which it is brought in connection.

M is a part of the slide-valve rod; N, the eccentric-yoke, and O the eccentric. The eccentric is fixed to a sleeve, P, that fits easily on the sleeve E, so that the latter can move beneath it. In addition to its bearing upon the sleeve E, the eccentric-sleeve P has bearing upon a collar, Q, that is fixed to the main shaft by a set-screw, R. This set-screw projects outward beyond the circumference of the collar, and carries a friction-roller, $r$, that occupies a circumferentially-extending slot, $p$, in the sleeve P. The slot has sufficient length to allow of the eccentric-sleeve making the required turning movement relatively to the crank-shaft A. The sleeve E has a spiral groove or slot, E', extending, say, one-half around it, the ends of the slot or groove being preferably parallel with the axis of the shaft, as shown in Figs. 1 and 2, so that the strain of the crank-shaft upon the eccentric will not tend to move the sleeve E endwise upon the shaft.

S is a screw fixed in the sleeve P, and carrying at its inner end a friction-wheel, $s$, that enters the slot or groove E', so that the endwise movement of the sleeve E upon the shaft causes the friction-wheel to travel along the slot or groove, and thus causes the eccentric-sleeve P to turn upon the main or crank shaft. The endwise movement of the eccentric-sleeve is prevented by the friction pin or screw R $r$ occupying the slot $p$.

The collar Q need not be made of a separate piece from the shaft A, but may be made in one piece therewith.

I claim as my invention—

1. An eccentric having a sleeve formed with circumferentially-extending slot, to receive a radial pin on the shaft and permit the sleeve to be turned.

2. The combination of an eccentric having a sleeve formed with circumferentially-extending slot a shaft, a radial pin occupying said slot, a cam-sleeve to slide endwise and keyed to the shaft, spiral groove and pin connection for the sleeves, and means to retain the eccentric to desired position.

3. The combination of an eccentric having a sleeve formed with circumferentially-extending slot and a radial pin, a crank-shaft having a feather longitudinally thereof, a collar intermediate of the eccentric-sleeve and crank-shaft, having a screw occupying the circumferentially-extending slot, and securing the collar to the crank-shaft, a cam-sleeve in line with the collar, having a spiral slot to receive the eccentric-sleeve pin, and a groove to receive the feather on the crank-shaft, and means to retain the eccentric in desired position.

4. An eccentric having capacity for rotary adjustment on the crank-shaft of a steam-engine, in combination with an actuating cam-sleeve, E, and cam-pin in the eccentric-sleeve working in the spiral cam groove or slot E' of sleeve E, and the pin or screw R, working in slot $p$ of the eccentric-sleeve.

5. The combination of shaft A, eccentric and sleeve O P, having slot $p$, studs or screws R and S, cam-sleeve E, with cam groove or slot E' and groove H, and the operating device I J K, all substantially as and for the purpose set forth.

EDWIN D. McLEAN.

Witnesses:
JOHN W. WELLS,
W. F. ALLEN.